United States Patent [19]
Brown

[11] Patent Number: 5,015,155
[45] Date of Patent: May 14, 1991

[54] MOTOR COVER ASSEMBLY AND METHOD
[75] Inventor: James M. Brown, Sidney, Ohio
[73] Assignee: Copeland Corporation, Sidney, Ohio
[21] Appl. No.: 498,699
[22] Filed: Mar. 26, 1990
[51] Int. Cl.$^5$ ............................................. F04B 39/14
[52] U.S. Cl. .................................. 417/360; 417/415; 417/902; 310/42; 310/89
[58] Field of Search .............. 417/360, 415, 902; 310/42, 89, 91

[56] References Cited
U.S. PATENT DOCUMENTS

| | | | |
|---|---|---|---|
| 3,169,696 | 2/1965 | Warner | 417/902 X |
| 3,500,084 | 3/1970 | Sachio Ito et al. | 310/91 X |
| 4,412,791 | 11/1983 | Lal | 417/902 X |
| 4,503,347 | 3/1985 | Bergman | 310/89 X |
| 4,593,217 | 6/1986 | Levine | 310/89 X |
| 4,606,706 | 8/1986 | Utter | 417/902 X |
| 4,796,352 | 1/1989 | Kawada et al. | 310/89 X |
| 4,889,475 | 12/1989 | Gannaway et al. | 417/902 X |

Primary Examiner—Leonard E. Smith
Assistant Examiner—Eugene L. Szczecina, Jr.
Attorney, Agent, or Firm—Harness, Dickey & Pierce

[57] ABSTRACT

A refrigeration compressor incorporating an improved arrangement and method for securing the motor cover to the motor stator is disclosed which arrangement and method also greatly facilitate the setting of the air gap between the stator and rotor.

8 Claims, 2 Drawing Sheets

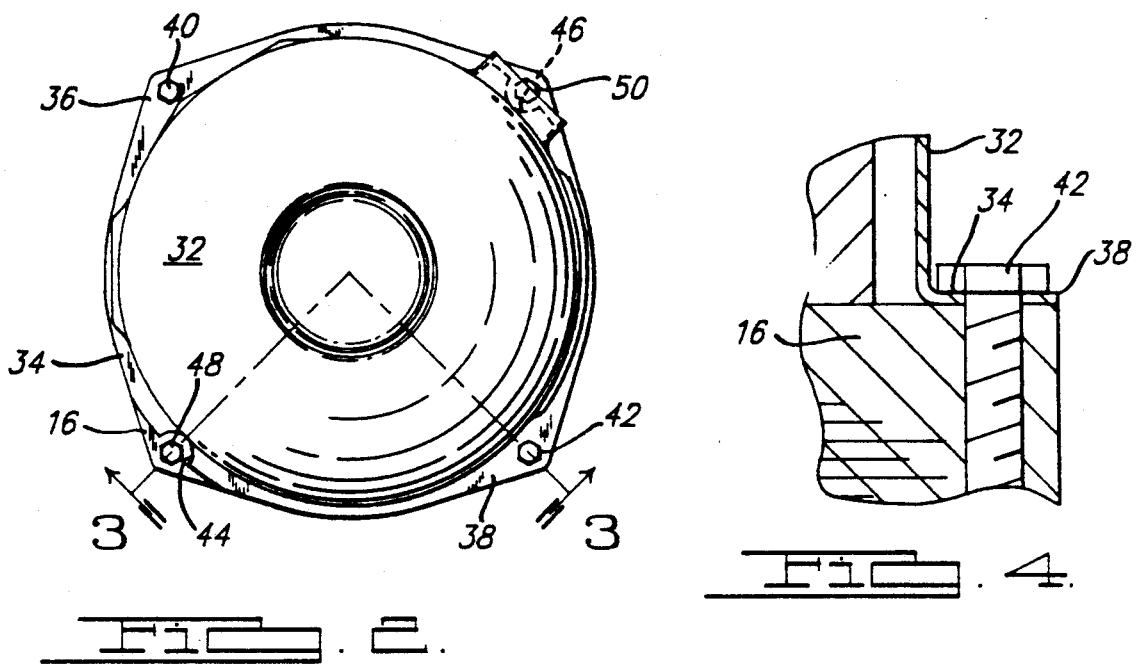
FIG. 2.
FIG. 4.
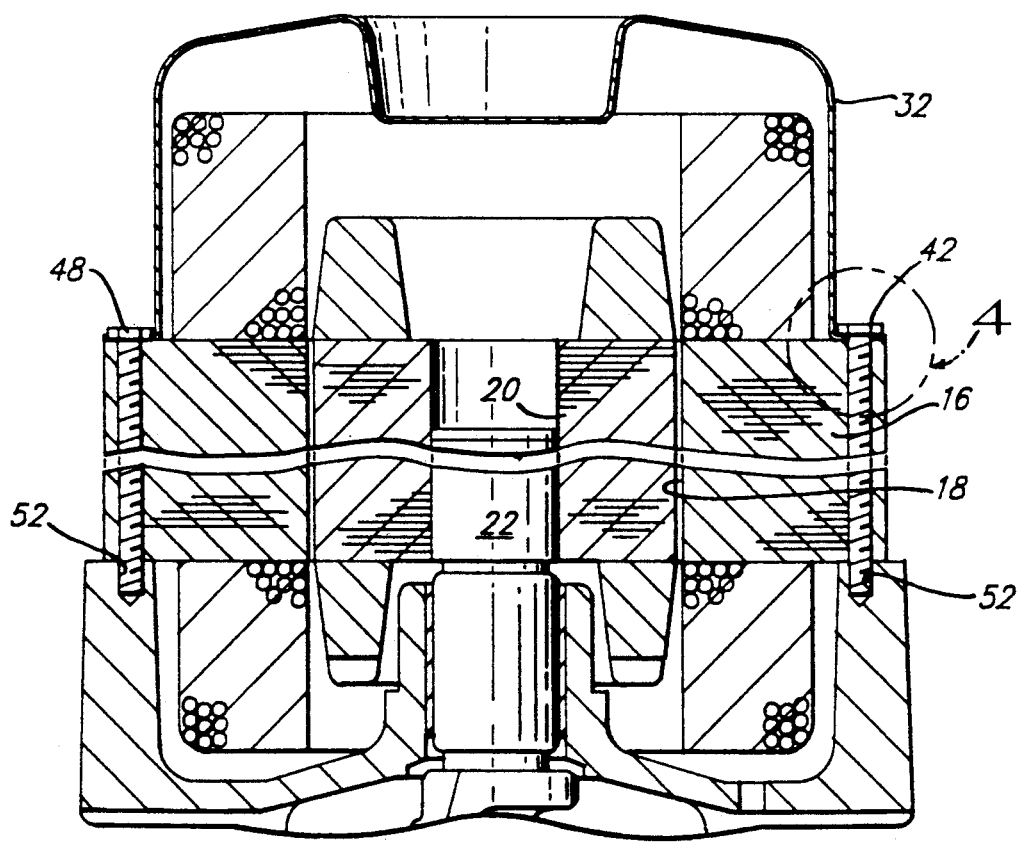
FIG. 3.

MOTOR COVER ASSEMBLY AND METHOD

BACKGROUND AND SUMMARY OF THE INVENTION

The present invention relates generally to refrigeration compressors and more specifically to hermetic refrigeration compressors incorporating a motor cover assembly which is designed to enable the air gap between the motor rotor and stator to be accurately set prior to securing the cover thereto and a method of assembling such motor covers and stators.

Hermetic refrigeration compressors normally incorporate a compressor and associated driving motor within a hermetically sealed shell. The motor will generally include a rotor secured to a drive shaft journaled in the compressor housing or other suitable bearing means and a stator secured to the compressor housing by means of bolts extending through the stator core. In many designs a motor cover is also porvided which is secured to one end of the stator by the same bolts used to secure the stator to the compressor housing. In such designs it is very difficult to insure accurate setting of the air gap between the rotor and stator due to the presence of the motor cover.

However, the present invention provides an inproved motor/motor cover assembly of the aforementioned general design but which allows the stator to be accurately positioned and secured to the compressor prior to assembly of the motor cover while still allowing the stator securing bolts to be used to secure the motor cover to the stator. In the present design a first pair of stator securing bolts are used to secure the stator in position once the air gap has been set. Thereafter the cover member is positioned over the stator and a second pair of stator securing bolts are inserted therethrough and tightened to thereby secure both the stator to the compressor housing and the cover to the stator.

This arrangement thus greatly facilitates the accurate and precise setting of the air gap yet does not require the separate fabrication and assembly of any additional components. Thus cost savings are obtained both in terms of labor and material while also providing a positive reliable securement of the motor cover.

Additional advantages and features of the present invention will become apparent from the subsequent description and the appended claims taken in conjunction with the accompanying drawings.

BRIEF DESCRIPTION OF THE DRAWINGS

FIG. 2 is a top view of the motor cover and associated underlying stator of FIG. 1, all in accordance with the present invention;

FIG. 3 is a fragmentary section view of the compressor, motor and associated cover of FIG. 1, the section being taken generally along the lines 3—3 of FIG. 2; and FIG. 4 is an enlarged framentary section view of the area enclosed by circle 4 in FIG. 3.

DESCRIPTION OF THE PREFERRED EMBODIMENT

Figure 1:
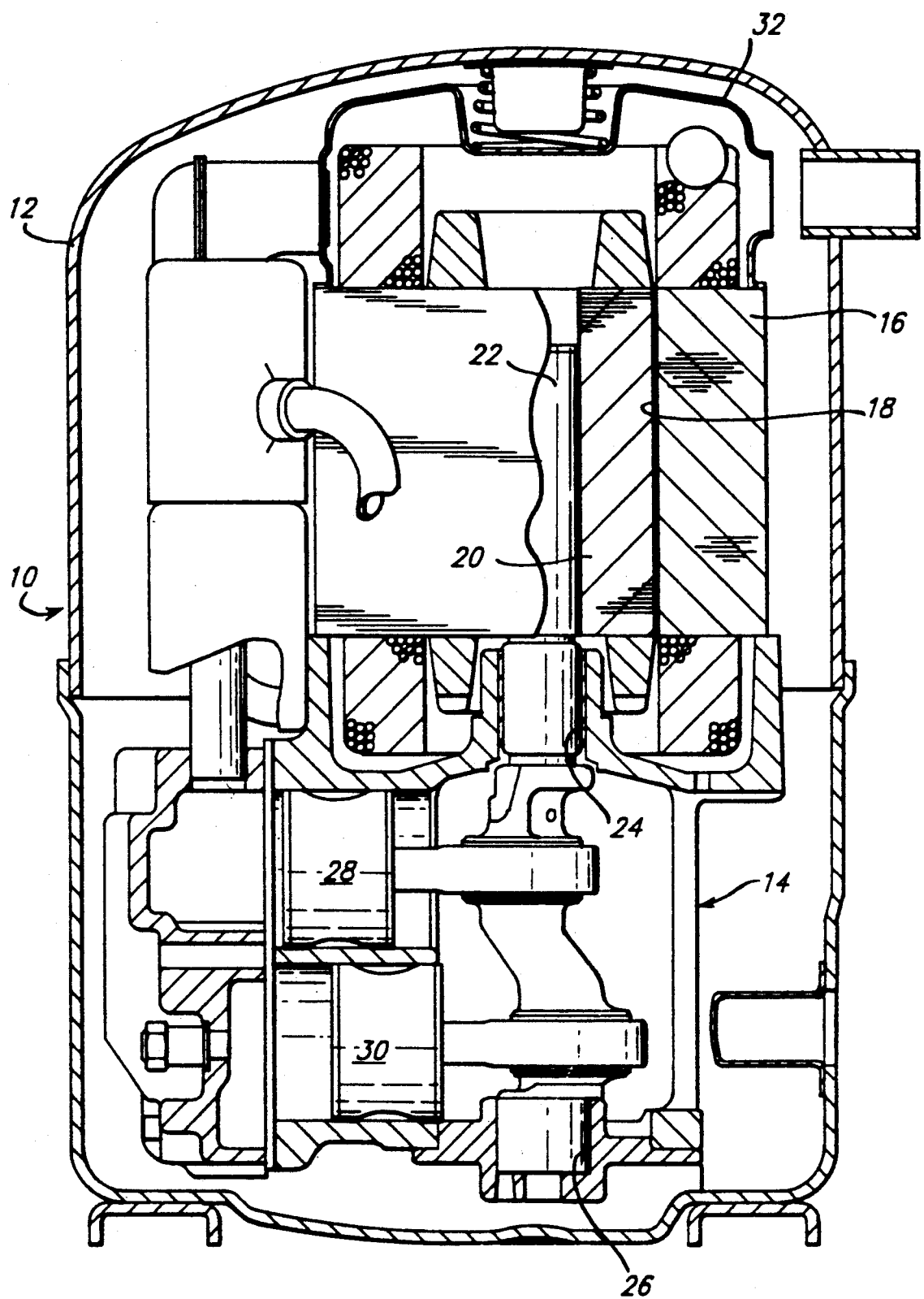
FIG. 1 is a section view of a hermetic refrigeration compressor in accordance with the present invention.

Referring now to the drawings and more specifically to FIG. 1, there is shown a refrigeration compressor generally indicated at 10. Refrigeration compressor 10 is of the hermetic reciprocating piston type and includes an outer shell 12 having a compressor housing 14 mounted therein. A driving motor stator 16 has one end supported by and is secured to compressor housing 14 and includes a cylindrical bore 18 within which a rotor 20 is supported by means of crankshaft 22. Crankshaft 22 is in turn rotatably supported by upper and lower bearings 24, 26 provided in compressor housing 14 and serves to reciprocatingly drive pistons 28, 30 provided in compressor housing 14 whereby refrigeration gas may be compressed. A motor cover 32 is also provided being secured to the end of stator 16 remote from compressor housing 14.

Referring now to FIGS. 2 and 3, motor cover 32 is generally cup-shaped and includes a peripheral flange portion 34 adapted to seat on the upper end of stator 16. Flange portion 34 includes a pair of diametrically opposed extensions 36 and 38 which serve to accommodate openings for bolts 40, 42. Also, a pair of diametrically opposed recesses or cutout portions 44, 46 are provided on flange 34 offset approximately 90° from respective extension 36, 38. Recesses 44 and 46 serve to provide a clearance for respective stator securing bolts 48, 50.

In assembling, the motor stator 16 is first positioned on the compressor housing 14 and centered so as to provide a uniform air gap between bore 18 and rotor 20. Thereafter stator securing bolts 48, 50 are tightened thereby locking stator 16 in position so as to assure the above noted uniform air gap is maintained. Next the motor cover 32 may be positioned in overlying relationship to the upper end of the stator with recess portions 44 and 46 aligned with the previously tightened stator securing bolts 48, 50. Thereafter, stator securing bolts 40 and 42 are inserted through openings provided in the extension portions 36, 38 of the motor cover, through the stator 16 and into threaded engagement with threaded bores 52 provided in compressor housing 14.

As thus assembled, motor cover 32 is securely retained in assembled relationship by means of stator securing bolts 40 and 42 while still allowing the stator 16 to be positively secured in position to afford a uniform air gap prior to assembly of the motor cover 32. This arrangement allows for a rapid and economical assembly of the refrigeration compressor.

While it will be apparent that the preferred embodiment of the invention disclosed is well calculated to provide the advantages and features above stated, it will be appreciated that the invention is susceptible to modification, variation and change without departing from the proper scope or fair meaning of the subjoined claims.

I claim:

1. A refrigeration compressor comprising:
    a compressor;
    motor means operative to drive said compressor, said motor means including a stator defining a cylindrical bore and a rotor rotatably supported within said bore;
    cover means overlying one end of said stator; and
    first and second fastening means securing said stator to said compressor,
    said second fastening means also securing said cover means to said one end of said stator, said first fastening means being spaced from said cover whereby said stator may be secured to said compressor by said first fastening means prior to assembly of said cover means.

2. A refrigeration compressor as set forth in claim 1 wherein said cover means includes a peripheral flange adapted to be positioned in opposed relationship to said one end of said stator, said second fastening means extending through openings in said peripheral flange portion.

3. A refrigeration compressor as set forth in claim 2 wherein said peripheral flange includes means defining a recess therein, said first fastening means being received within said recess.

4. A refrigeration compressor as set forth in claim 3 wherein said first and second fastening means comprise elongated threaded fasteners extending through bores provided in said stator.

5. A refrigeration compressor comprising:
 a compressor means including a compressor housing;
 a crankshaft rotatably carried by said compressor housing;
 motor means for rotatably driving said compressor means, said motor means including a rotor secured to said crankshaft and a stator surrounding said rotor;
 a first pair of elongated threaded fasteners securing one end of said stator to said compressor housing;
 motor cover means overlying the other end of said stator and spaced from said first pair of threaded fasteners; and
 a second pair of elongated threaded fasteners securing said motor cover means to said stator and said stator to said compressor housing.

6. A refrigeration compressor as set forth in claim 5 wherein said first and second threaded fasteners are substantially equally spaced.

7. A refrigeration compressor as set forth in claim 5 wherein said first and second threaded fasteners extend through bores provided in said stator.

8. A refrigeration compressor as set forth in claim 5 wherein said motor cover includes a peripheral flange having a pair of spaced recesses for accommodating said first threaded fasteners and a pair of spaced extended potions having openings through which said second threaded fasteners extend.

* * * * *

UNITED STATES PATENT AND TRADEMARK OFFICE
CERTIFICATE OF CORRECTION

PATENT NO. : 5,015,155
DATED : May 14, 1991
INVENTOR(S) : James M. Brown It is certified that error appears in the above-identified patent and that said Letters Patent is hereby corrected as shown below:

Column 1, line 20, "porvided" should be -- provided --.

Column 1, line 26, "inproved" should be -- improved --.

Column 2, line 9, "refrigeration" should be -- refrigerant --.

Column 2, line 21, "extension" should be -- extensions --.

Column 2, line 49, "susceptiple" should be -- susceptible --.

Column 3, line 8, Claim 3, "refigeration" should be -- refrigeration --.

Column 4, line 21, Claim 8, "potions" should be -- portions --.

Signed and Sealed this

Twenty-ninth Day of September, 1992

Attest:

DOUGLAS B. COMER

*Attesting Officer*   *Acting Commissioner of Patents and Trademarks*